March 8, 1966        J. W. RAIDER ETAL        3,239,735
DATA CONVERTING SERVO SYSTEM
Filed Oct. 13, 1961        4 Sheets-Sheet 1

INVENTORS
JERRY W. RAIDER
GEORGE W. SCOTT
ROBERT A. TUTTLE
BY Paul D Carmichael
ATTORNEY

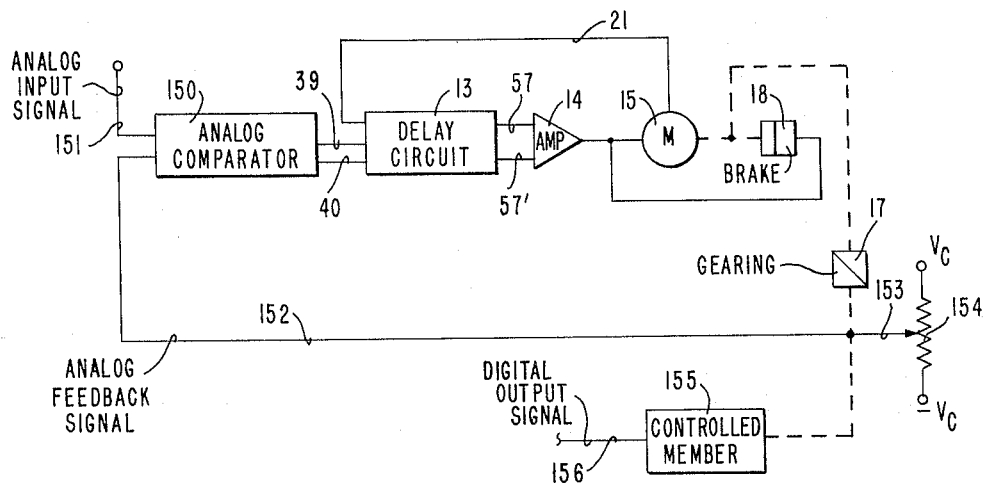
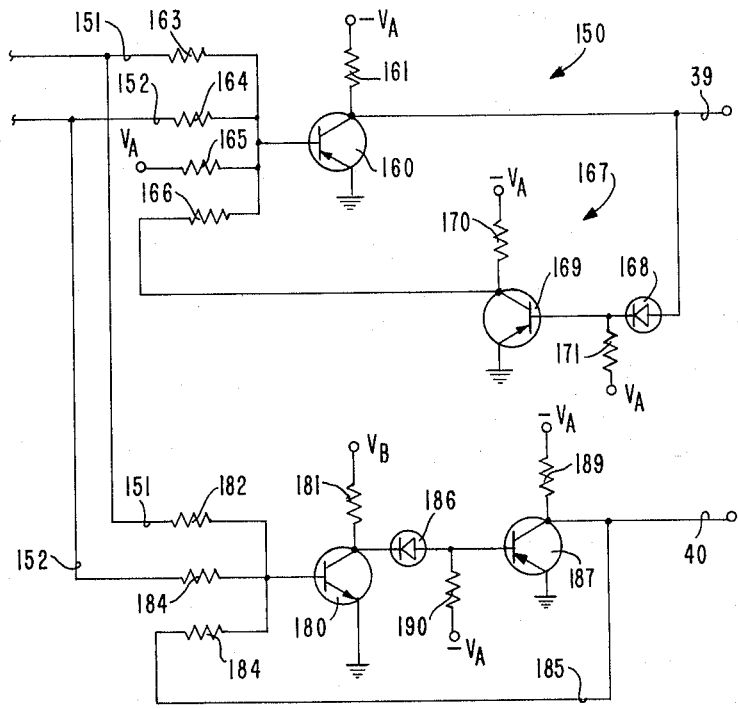

United States Patent Office 3,239,735
Patented Mar. 8, 1966

3,239,735
DATA CONVERTING SERVO SYSTEM
Jerry W. Raider, Endicott, George W. Scott, Vestal, and Robert A. Tuttle, Owego, N.Y., assignors to International Business Machines Corporation, New York, N.Y., a corporation of New York
Filed Oct. 13, 1961, Ser. No. 145,021
12 Claims. (Cl. 318—28)

The present invention relates generally to the control and data conversion arts and more particularly to a servo system for converting an input signal in one code to a corresponding output movement or signal in another code. For example, the input signal may comprise binary coded digital information quantities representing a desired condition while the output is an analog movement or signal corresponding to the desired condition.

It is well known in the art to employ a servo system for the above purpose. A conventional arrangement comprises an alternating current motor which is driven by a difference or error signal and whose output shaft positions a controlled member. The difference or error signal is provided by combining the coded input signal with a coded feedback signal representing the actual and present position of the controlled member. The controlled member is driven until its position agrees with the desired position and the difference signal is nulled.

In many applications, important requisites are the provision of such a servo system which is light in weight, requires low power, is extremely rugged and, above all, is characterized by its fast response and ability to properly position the controlled member with a minimum of hunting and/or overtravel. For example, in missile and aircraft control apparatus, the extremely high average velocities has given rise to the need for correspondingly high speed and accuracy in computing course information and deviations therefrom, and converting this information into analog form for repositioning or reorienting the missile or aircraft.

Briefly, the present invention relates to a data converting servo system wherein a braking means is associated with a servo motor. The servo motor is driven in response to difference signals provided by a comparison of the input and feedback signals. The braking means is properly actuated to brake the movement of the controlled member each time the difference signals indicate that the input and feedback signals are the same—i.e., the controlled member has reached its desired position. The braking means remains engaged until the controlled member has stopped moving. If overtravel has occurred, the braking means is then released and the controlled member is driven in the opposite direction back toward the desired position. In a minimum of time, the controlled member is at rest at the desired position and the braking means is engaged to hold the same at this position.

In the illustrated embodiment of the invention, this is accomplished by utilizing the electrical potential generated in the armature of the motor after a null has been indicated by the difference signals to prevent energization of the motor by the signals and enable actuation of the braking means by other means and to maintain this condition until the armature thereof has stopped rotating. The braking means causes the controlled member to stop with a minimum of overtravel. When the armature has stopped rotating, the electrical potential is no longer generated and the difference signals gain control to reverse the direction of rotation of the motor and move the controlled member back toward the desired position. Eventually, the difference signals indicate a null and the controlled member is stopped at the desired position. The braking means holds the motor and the controlled member at the desired position.

A direct current motor is employed and the same is driven at full speed in either a forward or reverse direction. Continuous power is not required as is the case with alternating current servo motors. The system is not adversely affected by temperature drift of amplifiers or other factors limiting the stability, accuracy and reliability of more conventional data converting servo systems.

It is the primary or ultimate object of the present invention to provide an improved converting servo system which is operative to position a controlled member as desired in a minimum of time and with a minimum of hunting and/or overtravel.

Another object of this invention is to provide a data converting servo system wherein auxiliary braking means or the like is actuated whenever the controlled member reaches the desired position to stop the same in a minimum of time. The braking means is disengaged as soon as the control member comes to rest so that the motor may drive the controlled member back toward the desired position if overtravel occurs. When the motor is stopped and the controlled member is at the desired position, the braking means remains engaged until a command or input signal indicating a new desired position for the controlled member is received.

A further object of the invention is to provide a data converting servo system of the type above described which is characterized by its simplicity in circuitry and operation, high reliability and low power requirements.

The foregoing and other objects, features and advantages of the invention will be apparent from the following more particular description of preferred embodiments of the invention, as illustrated in the accompanying drawings.

In the drawings:

FIGURE 9 is a block diagram of an analog-to-digital data converting servo system embodying the teachings of this invention; and FIGURE 10 is a schematic diagram of the analog comparator employed in the system of FIGURE 9.

Figure 1:
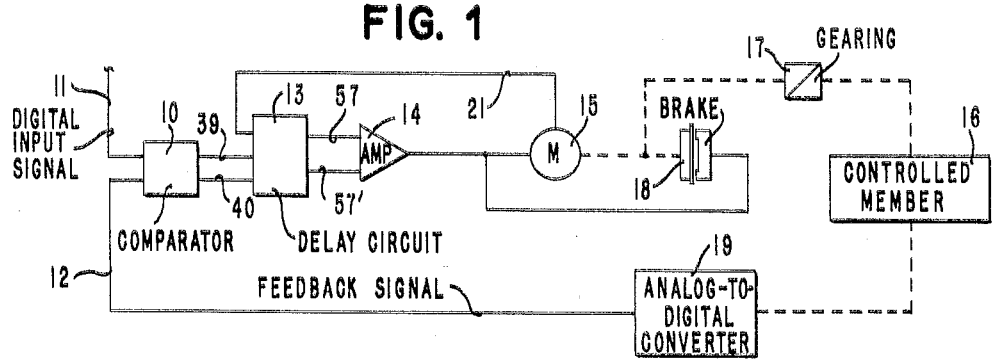
FIGURE 1 is a block diagram of a digital-to-analog data converting servo system constructed in accordance with the teachings of the present invention.

Referring now to the drawings, and initially to FIGURE 1 thereof, there is shown a data converting servo system which receives digital input signals and accurately positions a controlled member in response thereto. This system comprises a comparator 10 that combines digital input signals supplied over conductor 11 and digital feedback signals transmitted via conductor 12. The digital input signals may be supplied periodically by a high speed digital data processor or computer, not shown.

The comparator 10 provides difference signals to a delay circuit 13 which in turn energizes an amplifier 14. The amplifier 14 drives a direct current motor 15 whose armature positions a controlled member 16 via gearing 17. A mechanical brake 18 is disposed in braking relation with the output shaft of motor 15 and is operative, when properly actuated, to quickly exert a strong braking force and stop the armature of the motor 15 and controlled member 16. The controlled member 16 is coupled to an analog-to-digital converter 19 so that digital feedback signals corresponding to the actual position of the controlled member 16 are supplied to the comparator 10 over feedback conductor 12.

In general, the comparator 10 receives and compares the digital signals on conductors 11 and 12 representing the desired or commanded and actual positions of the controlled member 16, respectively. The difference signals from the comparator indicate that the motor 15 should be driven in a forward direction, in a reverse direction or should not be energized since the input and feedback signals are the same. The difference signals are then transmitted by delay circuit 13 and amplifier 14 to energize the direct current motor 15. The motor 15 is driven at full speed in either the forward or reverse direction to move the controlled member toward the desired position in response to the difference signals from the comparator.

A digital feedback signal is supplied serially by analog-to-digital converter 19 to comparator 10. When the input and feedback signals are the same (indicating the controlled member is at the desired position), the energizing power is immediately removed from the motor 15 and the brake 18 is actuated to quickly bring the armature of the motor and the controlled member 16 to a stop.

During the braking interval, the controlled member 16 may move beyond or overtravel the desired position. The comparator 10 will generate difference signals calling for reverse energization of the motor 15. However, during this time interval, the electrical potential generated in the armature of the motor 15 is returned over conductor 21 to the delay circuit 13. This electrical potential or blocking signal prevents the energization of the motor 15 until the armature thereof and the controlled member 16 have come to a stop. Thereafter, the brake is disengaged and the motor 15 is energized to drive the controlled member 16 back toward the desired position as represented by the digital input signal from the computer. Eventually, the armature of the motor and the controlled member will be stopped at the desired position and the brake is engaged to lock the system. The configuration of the various components and the overall operation of the data converting servo system will be hereinafter more fully described.

COMPARATOR

The comparator comprises a plurality of conventional logic blocks and the bold-face characters in each of the block symbols identifying the common name of the logic block represented. An And logic block performs Boolean multiplication in that no output is present unless and until signals are simultaneously present on each input thereof. The symbol Or designates a logic block performing the logical Or function whereby an output is present when a signal is applied to any of the various inputs thereof. Inverters, which perform the Boolean inversion, are indicated by the symbol I.

The latches L are binary storage devices settable in either of two stable states. Each latch has a set and a reset input conductor. When a signal is applied to the set input conductor, the latch is set in one of its bistable states. Further signals applied to the set input conductor will not change the state of the latch. However, a signal applied to the reset input conductor will cause the same to shift to its original bistable state. A more complete description of the logical operation of such a bistable device is found on pages 47–50 of a book by R. K. Richards, entitled "Arithmetic Operations in Digital Computers," published in 1955 by D. Van Nostrand, Inc.

It will be understood that any of a number of various circuit designs can be employed for performing the logical functions above described. In a constructed embodiment of the invention, the logic circuits operate on negative pulse logic with nominal voltage levels of $-V_A$ defining the binary one and zero or ground defining the binary zero. The selection of the potentials to represent the binary one and zero is completely arbitrary and a comparator could be constructed using other values.

Figure 2:
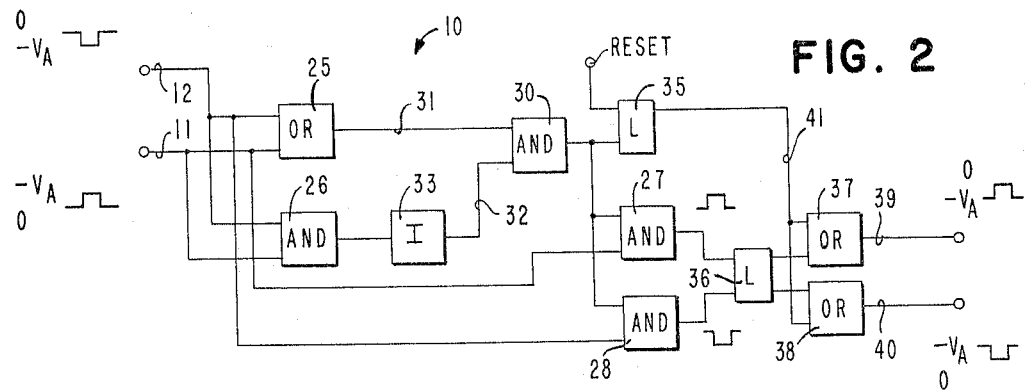
FIGURE 2 is a logical circuit diagram of the comparator used in the system of FIGURE 1.

With reference to FIGURE 2, the digital input and feedback signals on conductors 11 and 12 serve as the inputs to And logic block 26 and Or logic block 25. Further, the digital input signal serves as one input to And logic block 27 while the digital feedback signal provides one input to And logic block 28. The output of Or logic block 25 is coupled directly to an input of And logic block 30 by conductor 31. The remaining input to And logic block 30 is received over conductor 32 from inverter 33 and the output of And logic block 26.

The output of And logic block 30 serves as the other inputs to And logic blocks 27 and 28 and also is coupled to the set input of latch 35. The outputs of And logic blocks 27 and 28 energize the reset and set inputs of the latch 36, respectively. The output of latch 35 and the outputs of latch 36 are combined in Or logic blocks 37 and 38 to provide difference signals on conductors 39 and 40.

The digital input and feedback signals are applied to the comparator over conductors 11 and 12 in serial fashion (bit-by-bit), lower order first. For purposes of illustration, it will be assumed that the corresponding bits on conductors 11 and 12 represent the binary digits zero and one, respectively. The conductor 12 will be at a negative potential while conductor 11 will be at zero potential or ground during this bit time. The Or logic block 25 will be enabled whereby conductor 31 is at the binary one level. The And logic block 26 will not be energized since conductor 11 is at the binary zero level. However, the output of And logic block 30 will go to the logical one level since conductors 31 and 32 are both at this level due to inverter 33.

The output of logic block 30 drives the set input conductor of latch 35 to set the same whereby conductor 41 goes to the binary zero level. And logic block 28 is also enabled to drive the set input conductor of latch 36 whereby conductor 40 goes to the binary one level and conductor 39 to the binary zero level. This combination of difference signals is operative to drive the direct current motor 15 at full speed in a first direction, referred to in the description below as the reverse direction.

A similar analysis of operation when conductor 11 is at the binary one level and conductor 12 is at the binary zero level will show that the conductor 40 is at the binary zero level and that conductor 39 is at the binary one level. The difference signals are operative to drive the motor at full speed in a second or forward direction.

When the conductors 11 and 12 are simultaneously at the same binary level, the And logic block 30 is not energized and the output of latch 35 over conductor 41 enables both of the Or logic blocks 37 and 38. The difference conductors 39 and 40 are at the same binary level which indicates that the motor is not to be energized. The latch 36 may change state several times during the comparison of the digital input and feedback signals but this occurs at such a fast rate that the overall operation of the system is not affected. The reset input conductor of latch 35 is energized immediately prior to any comparison to shift this storage device to its original state.

The relationship between the digital signals on conductors 11 and 12 and the difference signals are set forth in the following table:

| Input Signal, Conductor 11 | Feedback Signal, Conductor 12 | Difference Signals, Conductors | | Motor Energization |
|---|---|---|---|---|
| | | 39 | 40 | |
| 0 | 1 | 0 | 1 | Reverse. |
| 1 | 0 | 1 | 0 | Forward. |
| 1 | 1 | 1 | 1 | Not Energized. |
| 0 | 0 | 1 | 1 | Not Energized. |

The comparator combines the input and feedback signals at an extremely fast rate to provide the difference signals. This component is characterized by its extreme simplicity when compared with digital substractors and the like which provide discrete magnitude difference in addition to direction of drive or sign difference signals.

DELAY CIRCUIT

Figure 3:
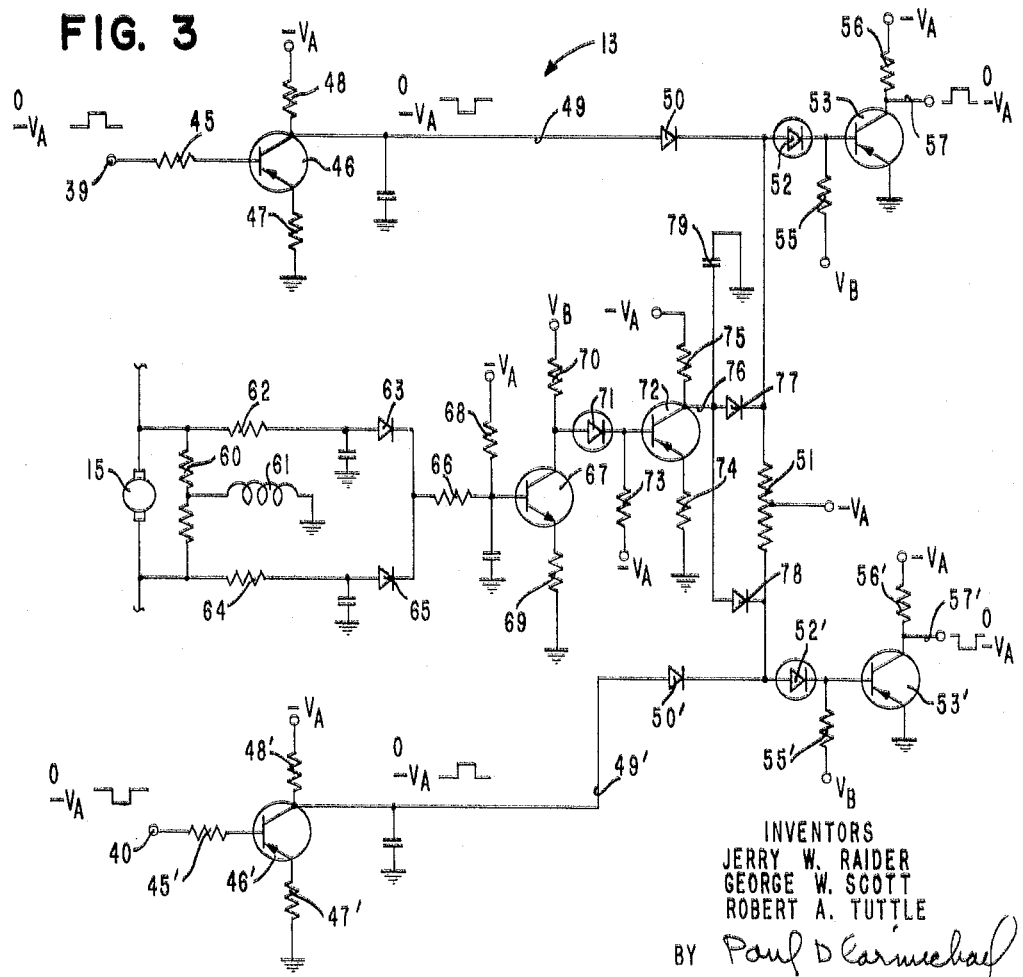
FIGURE 3 is a schematic circuit diagram of the delay circuit.

A schematic diagram of the delay circuit is shown in FIGURE 3 of the drawings. The difference conductor 39 is connected in series with resistor 45 to the base of PNP type transistor 46. The emitter of transistor 46 is referenced to ground through resistor 47 while the collector and load resistor 48 are connected in series to a direct current potential source $-V_A$. An output is taken over conductor 49 having a diode 50 disposed therein. The diode 50 is biased by circuitry including a center tapped resistor 51 and a potential source $-V_A$.

The conductor 49 leads to a Zener diode 52 which is connected to the base of a PNP type transistor 53. Further, the base of transistor 53 is electrically related to direct current potential source $V_B$ through resistor 55. The emitter of this transistor is grounded while the collector is connected in series with load resistor 56 and potential source $-V_A$. An output conductor 57 leads from the collector of the transistor 53.

The difference conductor 40 leads to circuitry similar to that described immediately above. To avoid unnecessary repetition in the specification, this circuitry will not be described in detail and primed reference numerals have been employed to designate the various elements thereof.

When conductor 39 is at the binary zero or ground potential level, the transistor 46 is in its nonconducting state and the conductor 49 falls to the binary zero level. In essence, the transistor 46 functions as an inverter. The diode 50 is at this time back biased from potential source $-V_A$ acting through center tapped resistor 51. The bias on the base of transistor 53 renders the same conductive so that the output conductor 57 goes to the binary zero level. This signal is transmitted to the amplifier 14 for controlling the energization of the motor 15.

For the illustrated case discussed in connection with the comparator 10, the difference conductor 40 will be at the binary one level and the difference conductor 39 will be at the binary zero level during this time interval. The negative signal applied to the base of transistor 46' renders the same conductive and the conductor 49' rises to the binary one level. The diode 50' is forward biased and a potential is applied to the base of transistor 53' which renders the same nonconductive. The output conductor 57' falls to the negative potential or binary one level.

During steady state operation of the data conversion servo system the output signals on conductors 57 and 57' correspond to the difference signals on conductors 39 and 40. When the comparator indicates that the motor 15 is to be driven in the forward direction, the conductor 57 will be at the binary one level and the conductor 57' will be at the binary zero level. When the input and feedback signals are the same and conductors 39 and 40 are both at the binary one level, the conductors 57 and 57' will also be at this level.

The direct current motor 15 has an armature winding which is rotatable in a magnetic field provided by a permanent magnet, for example. When energizing potential is supplied to the armature winding, the output shaft is caused to turn. However, when a torque is applied to the output shaft, an electrical potential is generated in the armature winding and the motor functions as a generator. If the armature of the motor 15 and the controlled member 16 are being driven at high speed through the null or desired position and the energizing potential is removed from the armature winding at the null, the armature and the controlled member will continue to rotate due to momentum thereof and a potential or blocking signal will be generated in the armature winding of the motor.

The opposite sides of the armature winding of the motor 15 are connected to the delay circuit by commutators or other similar means, not shown. A resistor 60 is disposed in parallel with the armature winding and is grounded at its center through an energizing coil 61 of the brake 18. One end of resistor 60 and one side of the armature winding are connected to a series circuit comprising resistor 62 and diode 63. A similar series circuit—including resistor 64 and diode 65—is connected to the other end of resistor 60 and the other side of the armature winding.

The two series circuits are connected via resistor 66 to the base of an NPN type transistor 67. The base of transistor 67 is connected to potential source $-V_A$ through resistor 68 while the emitter is connected to ground by resistor 69. The collector of this transistor is disposed in series with potential source $V_B$ and load resistor 70. An output is taken from the collector of transistor 67 over a conductor having a Zener diode 71 disposed therein. The transistor 67 performs amplification and inverting functions as will be further explained.

The output conductor from transistor 67 leads to the base of a PNP type transistor 72. The base of transistor 72 is referenced to potential source $-V_A$ by resistor 73 while the emitter is connected to ground through resistor 74. The collector of this transistor and load resistor 75 are connected in series relation to potential source $-V_A$ while an output is taken over conductor 76 and applied to the diodes 77 and 78. The diodes 77 and 78 are connected to the opposite ends of center tapped resistor 51 and to the base circuits of transistors 53 and 53', respectively. A filtering capacitor 79 is connected between the output conductor 76 and ground.

When the armature of the motor 15 and the controlled member 16 are driven to a desired position—i.e., the digital input and feedback signals are the same—the comparator 10 senses this condition and the difference signal on conductors 39 and 40 are both at the binary one level. The signals on conductors 57 and 57' will also be at the binary one level and energizing potential is removed from the armature winding of the motor. However, the armature of the motor and the controlled member continue to rotate due to the momentum thereof and a potential is generated in the armature winding. The polarity of this potential will, of course, depend upon the direction of rotation of the armature.

Equal voltages are developed across both end portions of the resistor 60 whereby no current flows through coil 61 and it is de-energized. The brake 18 is actuated to apply a strong mechanical braking force to the armature of the motor and the controlled member. Regardless of the direction of rotation of the armature and the polarity of voltage generated therein, the diodes 63 and 65 perform a blocking function to provide a positive voltage to the base of transistor 67. The positive voltage renders the transistor 67 conductive and the output thereof is then negatively biased by Zener diode 71 and applied to the base of transistor 72. Transistor 72 becomes conductive whereby diodes 77 and 78 are forward biased and transistor 53 and 53' are rendered nonconductive. As a result, the output conductors 57 and 57' fall to the binary one or negative voltage level and remain at this level until the armature of the motor and the controlled member have stopped rotating.

The pairs of diodes 50–77 and 50'–78, in combination with the biasing means therefor, define positive Or logic blocks which control the states of transistors 53 and 53'. The transistors 53 and 53' will both be rendered conductive whenever the armature of the motor is rotating and energizing potential is not supplied to the armature winding. The generated potential in the winding of the armature prevents the energization of the motor until the same has stopped regardless of the difference signals supplied over conductors 39 and 40 from comparator 10. When the armature and the controlled member come to a stop under the influence of the brake 18, the difference signals on conductors 39 and 40 gain control to drive the motor and the controlled member back toward the desired position.

AMPLIFIER

Figure 4:
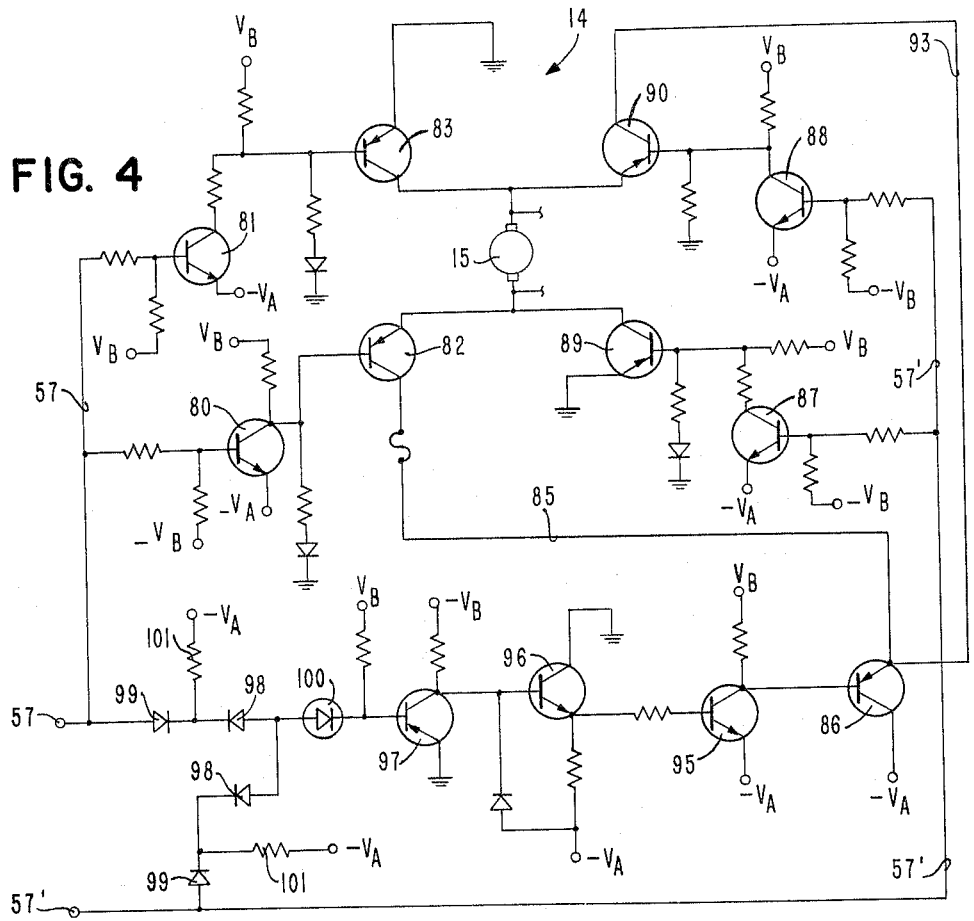
FIGURE 4 is a circuit diagram of the amplifier.

The conductors 57 and 57' serve as inputs to the amplifier 14 which is shown in detail in FIGURE 4 of the drawings. When conductor 57 is at the binary zero or ground potential level and conductor 57' is at the binary one or negative potential level, control transistors 80 and 81 are rendered conductive whereby a negative potential is applied to the bases of power transistors 82 and 83, respectively. The power transistors 82 and 83 are also rendered conductive whereby a circuit is completed for the energization of the armature winding of motor 15. This circuit can be traced from ground through conducting transistor 83, the armature winding of motor 15, conducting transistor 82, conductor 85 and conducting transistor 86 to potential source $-V_A$. When the armature winding of motor 15 is so energized, the controlled member 16 will be driven in the reverse direction.

The presence of a binary zero or zero potential on conductor 57' and a binary one or negative potential on conductor 57 will cause conduction of control transistors 87 and 88. Power transistors 89 and 90 are in turn rendered conductive so that a circuit is completed for the energization of the armature winding of motor 15. This circuit comprises conducting transistor 89, the armature winding of motor 15, conducting transistor 90, conductor 93, conducting transistor 86 and the potential source $-V_A$. With this energization, the controlled member is driven in the forward direction.

The motor 15 is energized by the amplifier 14 in accordance with the signals supplied by the delay circuit 13. The signals on output conductors 57 and 57' will both be at the negative level whenever the input and feedback signals are the same and/or when the armature of the motor is being braked to a stop and a blocking signal is generated. In this condition, the bases of control transistors 80–81 and 87–88 are maintained at a negative voltage level and these transistors do not conduct. As a result, the power transistors 82–83 and 89–90 remain nonconductive and the armature winding of the motor is not energized.

It is noted that the control of motor 15 depends only on output signals on conductors 57 and 57' being at different potential levels or both being at the negative potential level. The condition when both conductors 57 and 57' are at ground is not employed for control purposes although this condition may occur transiently during switching. The transistor 86 and the circuitry associated therewith are provided to protect the power transistors 82–83 and 89–90 of the amplifier from short circuit currents during this transient condition. If conductors 85 and 93 were connected directly to potential source $-V_A$ and the conductors 57 and 57' were both at ground, all control and power transistors would be rendered conductive at the same time. The power transistors would be subjected to excessive short circuit currents.

The conductive state of transistors 86 is controlled by a diode network and transistors 95, 96 and 97. The diode network comprises a pair of back-to-back diodes 98 and 99 connected to each of the conductors 57 and 57'. These two pairs of diodes are disposed in parallel relation with respect to each other and provide signals to a Zener diode 100. The diodes 99 are each back biased from potential source $-V_A$ through a resistor 101. The arrangement is such that as long as either or both of the conductors 57 or 57' is at a negative voltage level, a negative voltage will be supplied to the Zener diode 100. However, when both of the output conductors are at ground, the diodes 99 are both enabled and the potential supplied to the Zener diode 100 also goes to ground. The effect of this is to actuate the transistors 95–97 so that the transistor 86 is rendered nonconductive and the amplifier is disconnected from the source of driving potential for the motor. An effective protective circuit is provided to prevent damage to the components of the amplifier.

The armature winding of the motor has impressed thereacross a potential of approximately $-V_A$ volts when the amplifier energizes the same. As explained in connection with the delay circuit, a resistor 60 is disposed in parallel with the armature winding and is grounded at its center through an energizing coil 61 of brake 18. Whenever electrical energy is supplied to the armature winding of the motor, current will flow through resistor 60 and energizing coil 61 to ground. The energizing coil 61 is energized at this time and the brake is disengaged. However, whenever energizing current is not supplied to the armature winding of the motor and/or a voltage is being generated in this winding, the coil 61 is de-energized to engage the brake 18.

BREAKING MEANS

Figure 5:
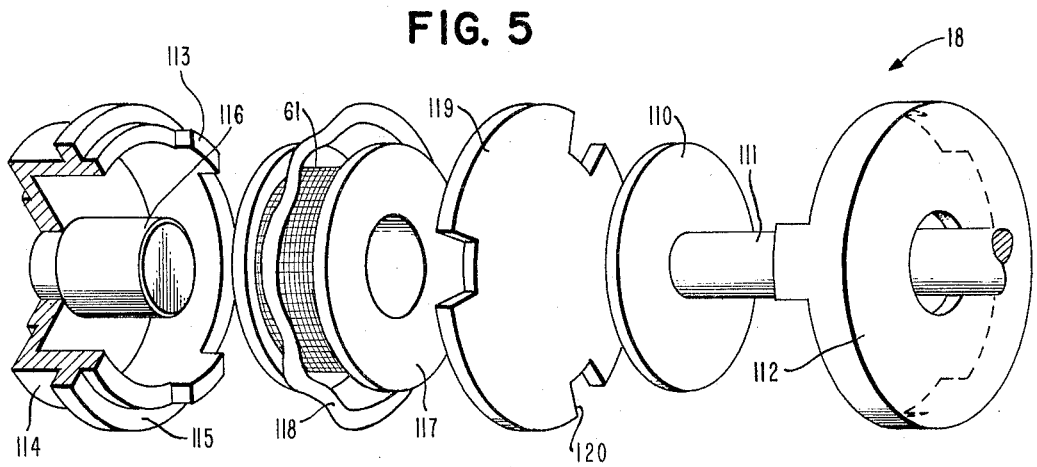
FIGURE 5 is an exploded side view, partially in section, of the clutch.

An exploded view of the brake 18 is shown in FIGURE 5 of the drawings. This brake comprises a rotating disc 110 which is mounted on the end of output shaft 111 of the motor 15. The output shaft 111 extends through an aperture in a circular cover cap 112. A housing member 114 having a circumferential flange 115 about its outer periphery is provided with an axially extending core 116. The housing member 114 also has three axially extending and circumferentially extending projections 113. An annular bobbin 117 supporting the energizing coil 61 is slideably received over the core 116. An annular and sinuous metal spring 118 rests on the flange 115 of the housing member 114. A circular armature plate 119 having circumferentially spaced notches 120 therein is disposed between the rotating disc 110 and the forward face of the core 116 in overlying relation with respect to the spring 118.

Figure 6:
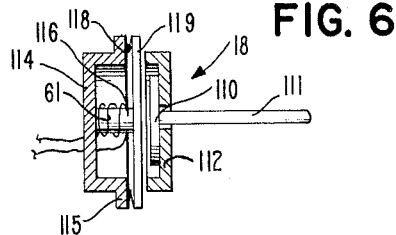
FIGURES 6 and 7 are fragmentary side sectional views of the clutch showing the states of operation thereof.
Figure 7:
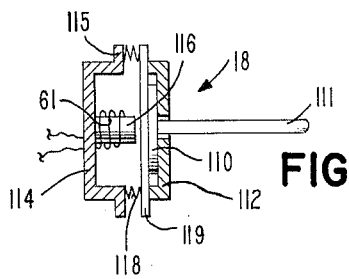

When the coil 61 is energized, as shown in FIGURE 6 of the drawing, the armature plate 119 is held against the forward face of the core 116 and the spring 118 is compressed between the outer edge of this plate and the circumferential flange 115 on the housing member 114. The armature plate 119 is disposed in spaced relation with respect to the disc 110 whereby the output shaft of the motor 15 and the controlled member 16 can rotate freely.

Energizing potential is removed from the energizing coil 61 whenever a null condition is sensed by the comparator 10 and/or a voltage is generated in the armature winding of the motor during overtravel of the controlled member. At this time the spring 118 gains control and forcibly moves the armature plate 119 into pressure engagement with respect to the rotating disc 110. A strong braking force is applied to the output shaft 111 of the motor to very quickly bring the controlled member and the armature of the motor to a stop or to hold the controlled member in a desired position. The armature plate 119 is prevented from rotating with disc 110 and is guided during its axial movement by the cooperating notches 120 in the armature plate and the projections 113 on the housing member 114.

The above-described braking means has been found particularly well adapted for use in the data converting servo system of the present invention since the armature of the motor and the controlled member are forcibly braked to a stop in a minimum of time and with a minimum of overtravel after a null has been sensed by the comparator 10. However, it should be understood that other braking means may be employed in carrying out the teachings of the invention. A strong braking force is applied to the armature of the motor and the controlled member whenever the coil 61 is de-energized.

OTHER COMPONENTS

The remaining components of the data converting servo system shown in FIGURE 1, such as motor 15, gearing 17 and analog-to-digital converter 19, are well known in the art. The motor 15 is a direct current motor and may be of the type marketed by Clifton Precision Products Company, Inc., of Clifton Heights, Pennsylvania, under catalog number DC–8–☐–1, size 8.

The analog-to-digital converter 19 performs a conversion function in that the actual position of the controlled member 16 is converted to a binary coded digital information quantity which is returned in serial form to the comparator 10 over feedback conductor 12. This converter may comprise a coded disc and transducing means of the type described in Chapter VI of a book entitled "Analog-Digital Conversion Techniques" by A. K. Susskind et al. and published in 1956 by the Massachusetts Institute of Technology Photo Service, Cambridge 39, Massachusetts.

OPERATION

Figure 8:
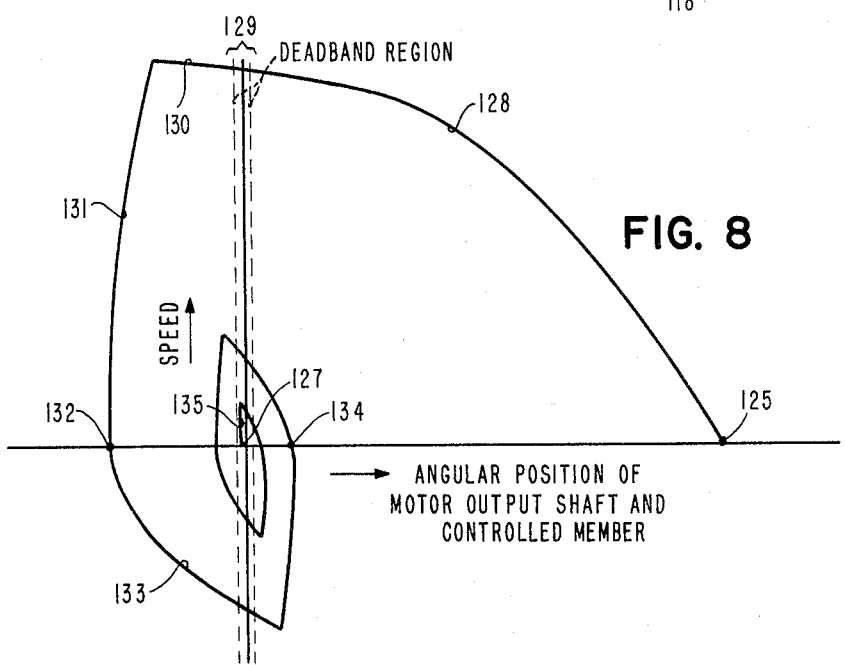
FIGURE 8 is a graphical representation of the angular displacement of the output shaft of the motor and the controlled member with respect to motor speed.

Considering now the operation of the data converting servo system above described, it will be assumed that the output shaft of the motor 15 and the controlled member 16 are initially at rest at a predetermined angular position as represented by the point 125 on the graph shown in FIGURE 8 of the drawings. It will also be assumed that a coded digital input signal is supplied over conductor 11 to the comparator 10 which indicates that the controlled member should be moved to a position represented by point 127 on the graph. The feedback signal on conductor 12 will at this time correspond to the actual position of the controlled member (position 125) and the comparator 10 will detect the difference between the input signal and the feedback signal. The difference signals on conductors 39 and 40 will go to the binary zero and one levels respectively and the motor 15 will be energized via delay circuit 13 and amplifier 14 to drive the controlled member 16 in the reverse direction as represented by portion 128 of the curve on the graph.

The motor 15 will drive the controlled member at a fast speed toward the angular position represented by point 127. Eventually, the controlled member will pass into a deadband region 129 and a null will be detected by the comparator 10. The deadband region 129 is defined as that incremental angular distance in which the comparator 10 will indicate a null condition and is provided by the analog-to-digital converter 19. A deadband region is desirable for the overall stability of the data converting servo system but the angular distance of this region is kept small so that the accuracy of the conversion system is not degraded.

As the controlled member passes through the deadband region 129, a null is detected by the comparator 10 whereby energizing potential is removed from the motor 15. The portion 130 of the curve to the left of the deadband region 129 indicates there is a time interval between successive comparisons of the input and feedback signals. The armature of the motor continues to rotate even though energizing potential has been removed and a voltage is generated in the armature winding. The coil 61 of the brake 18 is de-energized and the armature plate 119 is forced against the rotating disc 110 to quickly bring the armature of the motor and the controlled member to a stop. This is represented by the portion 131 of the curve and the controlled member is now positioned at point 132. During the braking interval the voltage generated in the armature winding of the motor renders transistors 53 and 53′ conductive whereby energizing potential is not supplied to the motor regardless of the difference signals present on conductors 39 and 40 from the comparator 10.

As soon as the controlled member and the armature of the motor come to a stop (point 132) and a voltage is no longer generated in the armature winding, the difference signals on conductors 39 and 40 gain control whereby the motor is energized to drive the controlled member in a positive direction toward the point 127. This is represented by portion 133 of the curve. When energizing potential is applied to the armature winding of the motor, the coil 61 of brake 18 is energized to retract the armature plate 119. The controlled member again passes through the deadband region 129 and is stopped by brake 18 in the manner above described. At this time the position of the controlled member is indicated by point 134 on the graph. It will be noted that the angular distance between points 127 and 134 is much less than the angular distance between point 127 and 132.

The armature of the motor and the controlled member are driven in alternate positive and negative directions until the speed of the driven assembly is such that the same can be brought to a complete stop within the deadband region 129. This is represented by portion 135 of the curve. The controlled member is now at point 127 and a null is detected between the input and feedback signals by comparator 10. The entire system is now at rest as energizing potential is not supplied to the motor 15. The coil 61 is not energized and the armature plate 119 is held firmly against rotating disc 110 by spring 118 to lock the controlled member in the desired position. Upon the occurrence of a digital input signal indicating a new position for the controlled member, the data converting servo system will very quickly and accurately position the controlled member in accordance therewith.

ANALOG-TO-DIGITAL CONVERTER

Another embodiment of the present invention is shown in FIGURES 9 and 10 of the drawings. This data converting servo system is employed for converting analog input signals to digital output signals. Many of the components of this system are the same as those disclosed in connection with the first embodiment of the invention and these components will not be further described.

Analog input and feedback signals are supplied to an analog comparator 150 over conductors 151 and 152, respectively. The analog comparator is operative to provide difference signals on conductors 39 and 40 leading to delay circuit 13. The output of the delay circuit controls the energization of motor 15 through an amplifier 14. The output shaft of the motor 15 is drivingly connected by gearing 17 to a movable pointer 153 having wiping contact with a potentiometer winding 154. The potentiometer winding 154 is connected across the voltage source $V_C$ so that an analog feedback signal proportional to the position of the pointer 153 is supplied to the comparator 150 via feedback conductor 152. The output shaft of the motor is also coupled with a controlled member 155 which may comprise the coded disc of an analog-to-digital converter. The controlled member 155 provides a digital output signal over conductor 156 which corresponds to the analog input signal. A brake 18 is disposed in braking relation with respect to the output shaft of the motor 15.

The analog comparator 150 is shown in FIGURE 10 of the drawings and comprises a pair of transistor circuits whose operations are controlled by the summation of various signals supplied thereto. A PNP type transistor 160 has its emitter referenced to ground while the collector and a load resistor 161 are connected in series with potential source $-V_A$. An output is taken from the collector of transistor 160 over difference conductor 39. The potential on the base of this transistor is controlled by a summing network comprising the parallel connected resistors 163–166. The resistor 163 receives the analog input signal from conductor 151 while resistor 164 receives the analog feedback signal from conductor 152. Resistor 165 is connected to potential source $V_A$ which provides a positive bias, while resistor 166 receives the output of a feedback circuit 167.

The feedback circuit 167 comprises a Zener diode 168 and a PNP type transistor 169. The emitter of transistor 169 is referenced to ground while the collector is connected to potential source $-V_A$ through resistor 170. A resistor 171 has one end connected to potential source $V_A$ while the other end is connected between the base of transistor 169 and the Zener diode 168. The transistor 169 performs an inverting function as will be hereinafter more fully apparent.

The remaining portion of the analog comparator 150 includes the NPN type transistor 180 whose emitter is referenced to ground and whose collector is connected in series with resistor 181 to potential source $V_B$. A summing network comprising resistors 182–184 controls the potential on the base of this transistor. The resistor 182 receives the analog input signal over conductor 151 while the analog feedback signal on conductor 152 is supplied to resistor 183. A feedback signal from difference conductor 40 is supplied via conductor 185 to resistor 184. An output signal is taken from the collector of transistor 180 and is applied through Zener diode 186 to the base of a PNP type transistor 187. The collector of transistor 187 and load resistor 189 are connected in series with potential source $-V_A$ while the emitter is referenced to ground. A resistor 190 is connected between potential source $-V_A$ and the base of transistor 187.

To demonstrate the operation of the analog comparator 150, it will be assumed that initially the sum or combination of the input and feedback signals is a positive going signal which starts from a highly negative level, passes through zero and continues to a positive level. The sum of the input and feedback signals is initially negative by an amount in excess of the positive voltage applied through resistor 165 so that transistor 160 is conductive and difference conductor 39 is at the ground or binary zero level. The zero potential on difference conductor 39 maintains the transistor 169 in its nonconductive state so that a negative voltage is applied to the resistor 166. The values of the resistors 165 and 166 are so related that the voltages developed thereacross are equal. The conductive state of transistor 160 is controlled solely by the analog input and feedback signals once the transistor 160 has been rendered conductive.

Under this set of conditions the negative voltage applied to the base of transistor 180 maintains same nonconductive and transistor 187 is also maintained nonconductive. The difference conductor 40 is at the $-V_A$ potential level representing the binary one. This combination of difference signals (conductor 39 at the binary zero level and conductor 40 at the binary one level) energizes the motor to drive the controlled member in the reverse direction.

As the controlled member is driven in the reverse direction the summation of the input and feedback signals becomes less negative. At the null condition when the input and feedback signals are the same, the sum of these two signals will be at the zero potential level. As the sum of the signals begins to go positive, due to overtravel of the armature of the motor and the controlled member, the base of transistor 160 becomes positive and this transistor is rendered nonconductive whereby the signal on difference conductor 39 falls to the binary zero level. Both of the difference conductors 39 and 40 will be at the binary one level and energizing potential is removed from the motor. The brake 18 is actuated and the armature of the motor, the movable pointer 153 and the controlled member are stopped in a minimum of time and with a minimum of overtravel.

The combined signal from the input and feedback conductors goes positive due to the overtravel of a movable pointer 153 and eventually this positive signal overrides the effect of the feedback signal on conductor 185 and the voltage developed across resistor 184 to render transistor 180 conductive. Transistor 187 also becomes conductive and the difference conductor 40 goes to the binary zero level. The difference signals indicate at this time that the motor should be energized to drive in the forward direction. The motor is not energized until the controlled member has been braked to a complete stop due to the potential generated in the armature winding of the motor and the operation of the delay circuit 13. However, when the controlled member has come to a complete stop the difference signals gain control and the motor is driven in the forward direction back toward the null position.

It will be noted that the signals on the difference conductors 39 and 40 do not change states at the same time. In the above example, the transistor 180 is not rendered conductive until the bias provided by feedback conductor 185 and resistor 184 has been overcome. There is a short period of time following the occurrence of a null when the difference conductors 39 and 40 are both at the binary one level. This period of time provides the deadband for the data converting servo system and is defined by an incremental angular movement of the movable pointer 153 and the controlled member when the input signal representing the desired position is at a constant value.

When the sum of the input and feedback signals goes negative from a positive value, through zero and to a negative level, the transistors 180 and 187 are rendered nonconductive when the signal is at the zero potential level while the transistor 160 is not rendered conductive until the sum of the input and feedback signals is sufficient to overcome the positive bias applied through resistor 165. In this embodiment of the invention the deadband region is provided by the operation of the analog comparator 150. In the first-described embodiment the comparable deadband is provided by the analog-to-digital converter 19.

CONCLUSION

It should now be apparent that the objects initially set forth have been accomplished. Of particular importance is the provision of a highly simplified data converting servo system wherein the voltage generated in the armature winding of a motor during braking is employed to control the energization of this motor. A controlled member is positioned in accordance with an input signal in a minimum of time and with a minimum of overtravel or hunting.

While the invention has been particularly described with reference to preferred embodiments thereof, it will be understood by those skilled in the art that the foregoing and other changes in form and details may be made therein without departing from the spirit and scope of the invention.

What is claimed is:

1. A servo system for positioning a controlled member in accordance with an input signal comprising, in combination:

a motor having an armature winding;
    a controlled member directly coupled with said motor;
    means providing an input signal representing the desired position of said controlled member;
    means providing a feedback signal representing the actual position of said controlled member;

comparator means for comparing said input and feedback signals;

said comparator means providing difference signals representing the direction said motor is to be rotated and indicating a null condition when said input and feedback signals are the same;

means controlling the energization of said armature winding of said motor in response to said difference signals;

said motor being de-energized by said means controlling when said difference signals indicate a null condition;

means responsive to an electrical signal being generated in said armature winding of said motor, when said controlled member is still moving after said motor has been de-energized, to maintain said motor de-energized while said electrical signal is present;

a brake means operatively connected to said controlled member for braking said controlled member when actuated;

means to actuate said brake means in response to said motor being de-energized whereby said brake means is actuated until said controlled member comes to rest.

2. Apparatus according to claim 1 wherein:

said means to actuate comprises a resistor connected across said armature winding;

an energizing coil for said brake means connected to the center of said resistor and referenced to ground;

said means controlling impressing a potential difference with respect to ground across said armature winding so that current flows through said coil to energize the same; and said energizing coil being maintained de-energized when said electrical signal is generated in said armature winding after a null condition is sensed.

3. Apparatus according to claim 2 wherein:

said means controlling comprises a pair of binary switching elements;

said difference signals controlling the state of said switching elements;

circuit means interconnecting said resistor and said switching elements; and said circuit means causing actuation of said switching elements to prevent energization of said motor when said electrical signal is present.

4. Apparatus according to claim 3 wherein:

said circuit means comprises rectifying means and a third switching element;

said rectifying means providing signals controlling the state of said third switching element;

a logical Or circuit providing the input to each of said pair of said switching elements;

one input for each logical Or circuit being one of said difference signals; and another input for each logical Or circuit being the output of said third switching element.

5. A data converting servo system comprising, in combination:

a motor;

a movable controlled member;

said motor being drivingly connected with said controlled member for changing the position thereof;

means generating a feedback signal representative of the actual position of said controlled member;

an input signal representing the desired position of said controlled member;

control means for comparing said feeback and input signals and controlling the energization of said motor;

said control means being operative to de-energize said motor when said input and feedback signals are the same;

detection means to detect when said motor is de-energized but still rotating;

brake means operatively related to said controlled member for braking said controlled member when actuated;

means responsive to said motor to actuate said brake means to quickly stop movement of said controlled member when said motor has been de-energized; and means responsive to said detection means to prevent the energization of said motor until said controlled member has come to a stop after said motor has been de-energized.

6. Apparatus according to claim 5 wherein:

said motor has an armature winding;

an electrical signal being generated in said armature winding when said motor is traveling after said motor is de-energized; and said electrical signal being detected by said detection means.

7. Apparatus according to claim 5 wherein:

said motor has an armature winding;

said means responsive comprises an impedance element connected in series across said armature winding; and an energizing means connected to said impedance element and a reference potential.

8. A data converting servo system comprising, in combination:

a motor;

a controlled member directly connected with said motor;

feedback means providing a feedback signal representing the actual position of said controlled member;

an input signal representing the desired position of said controlled member;

control means for comparing said input and feedback signals and in response thereto energizing motor and accelerating said controlled member toward the desired position;

said control means responsive to the comparison to de-energize said motor when said controlled member is in a deadband region very near the desired position and also responsive to continued rotation of said motor, after said controlled member crosses the deadband region, to maintain said motor de-energized until said motor comes to rest;

a brake means disposed in braking relation with said controlled member for decelerating said controlled member;

means to actuate said brake means when said controlled member is in the deadband region; and means responsive to the de-energized state of said motor to maintain said brake means in the actuated condition, after said controlled member crosses the deadband region, until the motor comes to rest.

9. Apparatus according to claim 8 wherein:

said motor has an armature; and said means to maintain comprises means to sense the de-energized condition of said armature.

10. Apparatus according to claim 1 wherein said comparator means comprises:

a pair of Or logic blocks;

a first bistable device providing an input to each of said Or blocks;

a second bistable device providing an input to each of said Or blocks;

means to control the state of said first bistable device in response to the presence of a difference between said input and feedback signals so that said first bistable device will energize one or the other of said Or blocks and thereby indicate the direction of drive for said motor;

means to set said second bistable device in one state whenever said input and feedback signals are the same so that said second bistable device will energize both of said Or blocks and thereby indicate a null condition; and said means controlling providing difference signals representing the direction of drive for said motor and indicating a null condition when said input and feedback signals are the same.

11. Apparatus according to claim 3 wherein said means controlling further comprises:

a source of energizing potential;

a pair of circuit paths interconnecting said source and said motor;

said circuit paths each including at least one switching device;

said switching devices responsive to said switching elements whereby when both of said switching elements are in a first state neither of said circuit paths are completed, when only one of said switching elements is in said first state one of said circuit paths is completed, and when only the other of said switching elements is in said first state the other of said circuit paths is completed;

a third switching device common to each of said circuit paths;

means detecting when both of said switching elements are in the second state; and said means detecting controlling said third switching device to open both of said circuit paths when said switching elements are in the second state.

12. Apparatus according to claim 1 wherein said comparator means comprises:

a pair of switching devices;

a summing network controlling the energization of each of said switching devices;

means supplying said input and feedback signals to each of said summing networks;

said summing networks in response to the difference between said input and feedback signals energizing one or the other of said switching devices to indicate the direction of drive for said motor; and said summing networks energizing both of said switching devices, whenever said input and feedback signals are the same, to indicate a null condition.

References Cited by the Examiner
UNITED STATES PATENTS

| | | | |
|---|---|---|---|
| 1,845,481 | 2/1932 | Claytor | 318—372 |
| 2,990,506 | 6/1961 | Montross | 318—284 |
| 3,045,157 | 7/1962 | Jacquet et al. | 318—28 |

References Cited by the Applicant
UNITED STATES PATENTS

| | | |
|---|---|---|
| 2,829,323 | 4/1958 | Steele. |
| 2,843,811 | 7/1958 | Tripp. |
| 2,846,630 | 8/1958 | Boyle et al. |
| 2,860,293 | 11/1958 | Salamonovich. |
| 2,860,294 | 11/1958 | Steele. |
| 2,870,437 | 1/1959 | Scarrott et al. |
| 2,873,418 | 2/1959 | Owen. |
| 2,875,392 | 2/1959 | Pinckaers. |
| 2,881,375 | 4/1959 | Kennedy. |
| 2,921,247 | 1/1960 | Morrison. |

JOHN F. COUCH, *Primary Examiner.*